(12) United States Patent
Chiu

(10) Patent No.: US 8,297,326 B2
(45) Date of Patent: Oct. 30, 2012

(54) COMPOSITE BALL-BOUNCING TYRE

(76) Inventor: Chin-Jung Chiu, Xinzhuang (TW)

( * ) Notice: Subject to any disclaimer, the term of this patent is extended or adjusted under 35 U.S.C. 154(b) by 408 days.

(21) Appl. No.: 12/545,332

(22) Filed: Aug. 21, 2009

(65) Prior Publication Data

US 2010/0276052 A1    Nov. 4, 2010

(30) Foreign Application Priority Data

May 1, 2009   (TW) .............................. 98114078 A

(51) Int. Cl.
  *B60C 5/00*     (2006.01)
  *B60C 5/02*     (2006.01)
  *B60C 19/00*   (2006.01)

(52) U.S. Cl. .................. 152/450; 152/331.1; 152/336.1; 152/510; 152/511; 152/310; 152/317

(58) Field of Classification Search .................. 152/324, 152/336.1
See application file for complete search history.

(56) References Cited

U.S. PATENT DOCUMENTS 910,457 A * 1/1909 Bryant .......................... 152/317
1,392,951 A * 10/1921 Lee ................................ 152/511
4,923,252 A * 5/1990 Plamper et al. .......... 301/64.704
5,660,447 A * 8/1997 Angelici ........................ 301/5.7
7,334,617 B2 * 2/2008 Hill et al. ........................ 152/47

FOREIGN PATENT DOCUMENTS

CN    200957743    * 10/2007
TW    200916345    * 4/2009

* cited by examiner

*Primary Examiner* — Justin Fischer
(74) *Attorney, Agent, or Firm* — Muncy, Geissler, Olds & Lowe, PLLC

(57) ABSTRACT

The present invention relates to a composite ball-bouncing tire, comprising a subtire and an inner tube inside it, wherein the subtire includes a space between a ring-shaped base and its side walls, and the space includes a plurality of rails and fastening grooves that are arranged at intervals on its inner walls. A slope part that converges against the rolling-forward direction is established atop on both sides of the plurality of the rails, and at the bottom of the fastening grooves, there is a plurality of fixing grooves. One or more resilient balls are established in each rail and the inner tube includes a plurality of fixing parts on top of outer walls of a base component. When the subtire and inner tube rolls, the resilient balls will be pushed into the rails along the slope part and be pressed to bounce, thus producing supplementary force to drive the tire to move forward. Besides, when the inner tube is inflated, its fixing parts can be combined with the fastening grooves of the subtire, while the inner tube is deflated, it can be disengaged from the subtire, thus allowing the subtire or inner tube to be replaced independently.

3 Claims, 6 Drawing Sheets

COMPOSITE BALL-BOUNCING TYRE

This application claims the priority benefit of Taiwan patent application number 0988114078 filed on May 1, 2009.

BACKGROUND OF THE INVENTION

1. Field of the Invention

The present invention relates to a composite ball-bouncing tyre, more particularly, to a tyre that comprises a subtyre (or tyre cover) and an inner tube, wherein the subtyre includes concave rails, fastening grooves and fixing grooves, while the inner tube includes convex fixing parts and fastening parts that correspond to the rails, fastening grooves and fixing grooves. By using these concave and convex parts, it not only allows the area of contact between the subtyre and the inner tube to be enlarged, but also enables the subtyre to weigh less, thus achieving better safety and energy-saving effect. Besides, the subtyre and the inner tube can be assembled and fixed after the inner tube is inflated, and disengaged from each other after the inner tube is deflated, thus allowing the subtyre or inner tube to be replaced independently and making a breakthrough in the shape of conventional inner tubes that are always round.

2. Description of the Prior Art

In composite ball-squeezing and bouncing tyres that are capable of saving gas and energy, inner tubes are usually round and combined with subtyres in small area of contact, and the subtyres are much heavier. Therefore, how to improve the energy-saving effect of such tyres is what the inventor tries his best to research and improve.

SUMMARY OF THE INVENTION

In view of the aforesaid problems and disadvantages, the inventor has collected related information, conducted assessments and taken considerations in many aspects, and based on his own experience of many years in this industry, has finally invented the composite ball-bouncing tyre that is capable of saving energy and convenient for dismantling following continuous trials and corrections.

The primary object of the present invention is to establish concave rails, fastening grooves and fixing grooves in the subtyre and establish convex fixing parts and fastening parts that correspond to the rails, fastening grooves and fixing grooves in the inner tube, so that the area of contact between the subtyre and inner tube can be enlarged and the weight of the subtyre can be reduced by using these convex and concave parts, thus achieving better safety and energy-conserving effect.

The secondary object of the present invention is to ensure that when the wheel rim drives the subtyre and inner tube to roll, the inner tube will press against one or more resilient balls in the rail. With a slope part and a converging groove, the inner tube pushes the resilient balls in the slope part to move into the converging groove. When the inner tube moves to press the resilient balls in the converging groove, these resilient balls will deform and press against the walls of the rail in front of the slope part, thus applying a supplementary pushing force on the subtyre along the rolling direction. As a result, vehicles will require less force to drive tyres to roll. This not only helps reduce the oil consumption of the vehicles, but also achieves the objectives in energy saving and environmental protection.

A further object of the present invention is to closely combine the subtyre with the inner tube by inflating the inner tube, and to enable fixing parts to be disengaged from the fastening grooves by deflating the inner tube, so as to separate the subtyre from the inner tube. So if the tyre is worn down or pierced by sharp articles, the subtyre or inner tube can be replaced independently, thus saving costs for repair and maintenance of tyres.

DETAIL DESCRIPTION OF THE INVENTION

To achieve the aforesaid objects and functions as well as the techniques applied in the present invention and its fabrication, an example of the preferred embodiment of the present invention is given to describe the features and functions of the present invention in detail by referring to the accompanying drawings.

Figure 1:
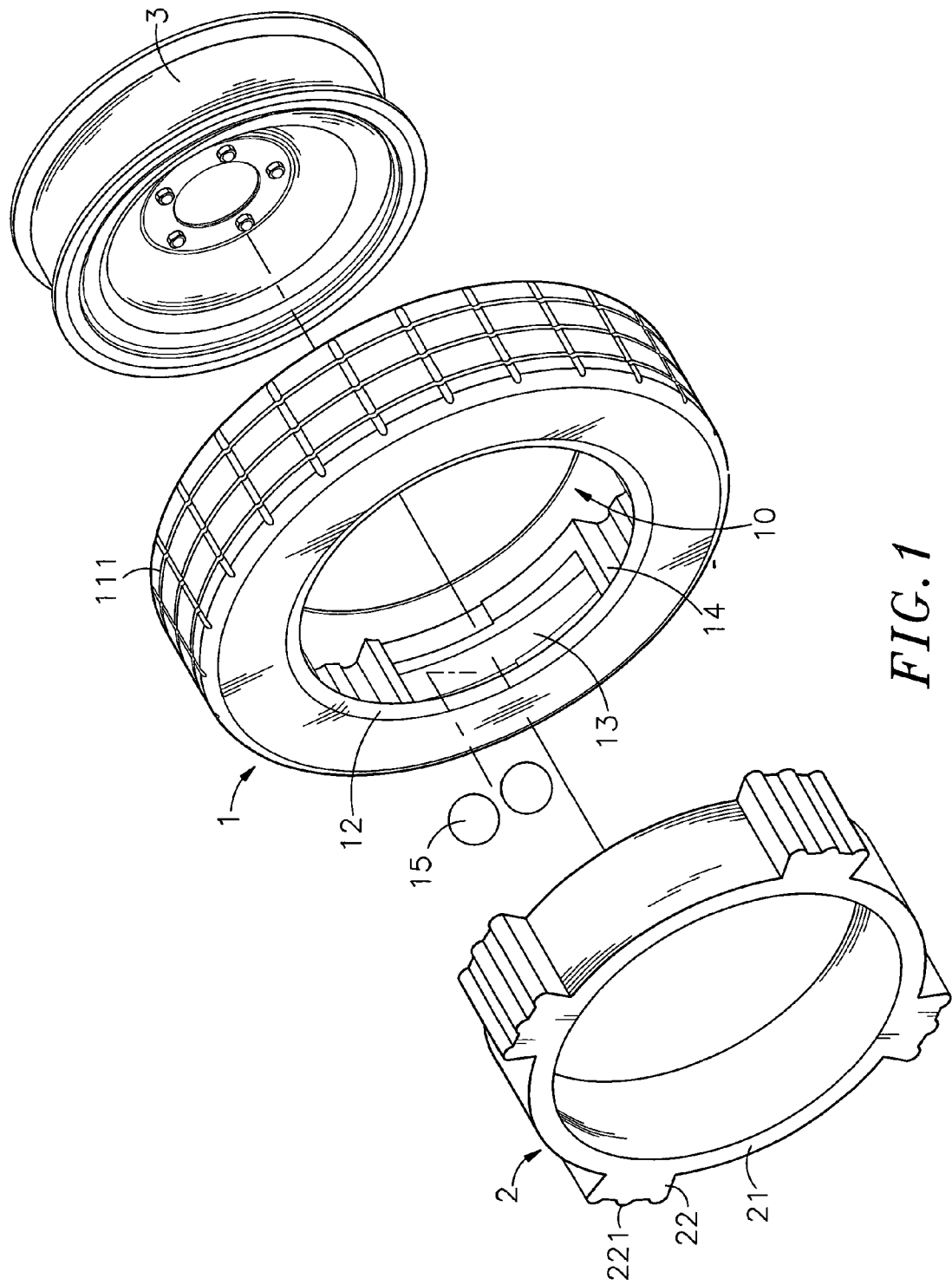
FIG. 1 is a three-dimensional decomposition drawing according to one preferred embodiment of the present invention.
Figure 2:
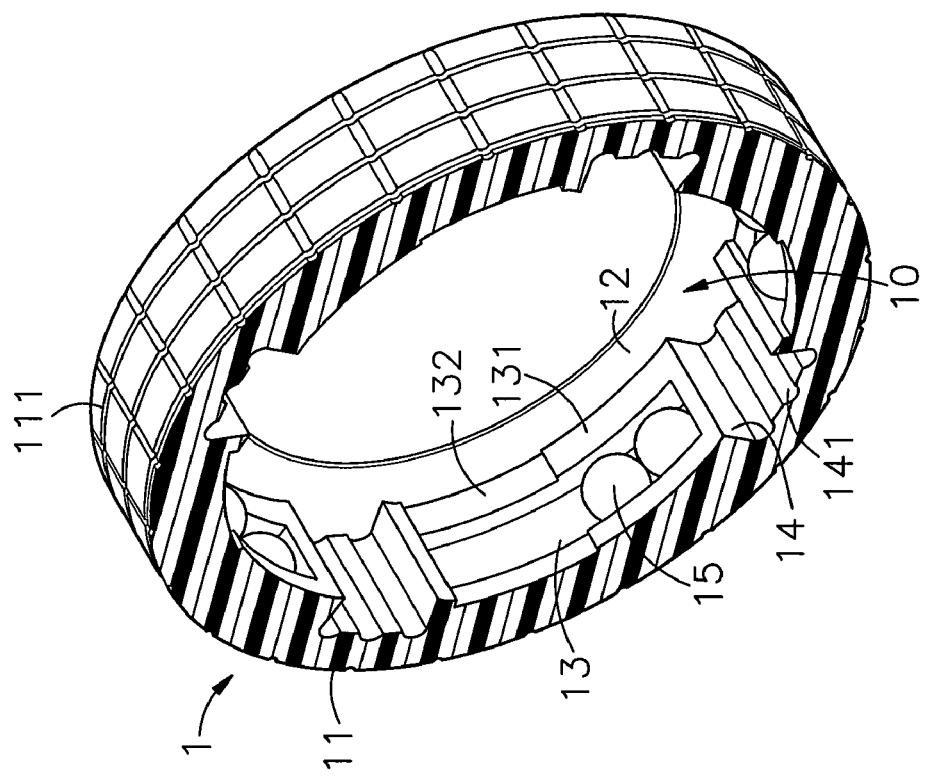
FIG. 2 is a sectional axonometric drawing of a subtyre disclosed in the present invention.
Figure 3:
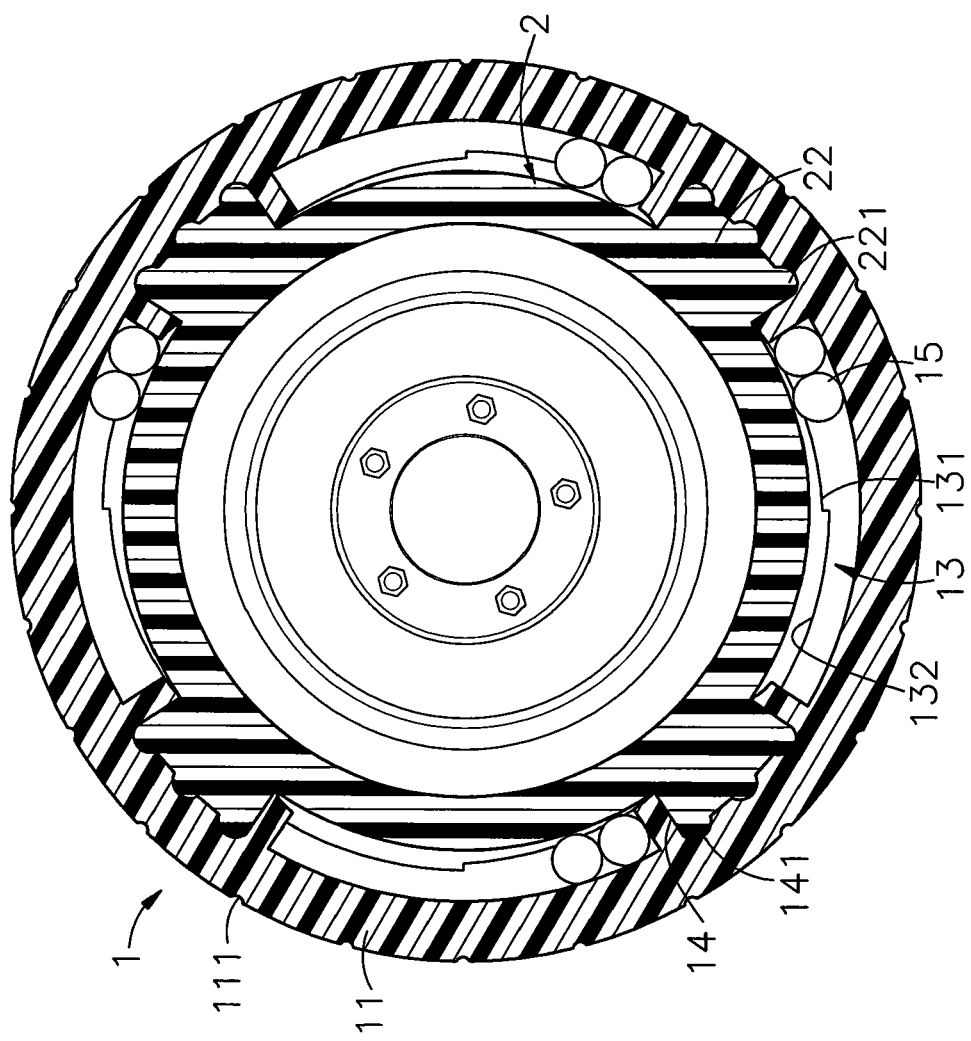
FIG. 3 shows the section of the present invention from a side view according to a preferred embodiment of the present invention.
Figure 4:
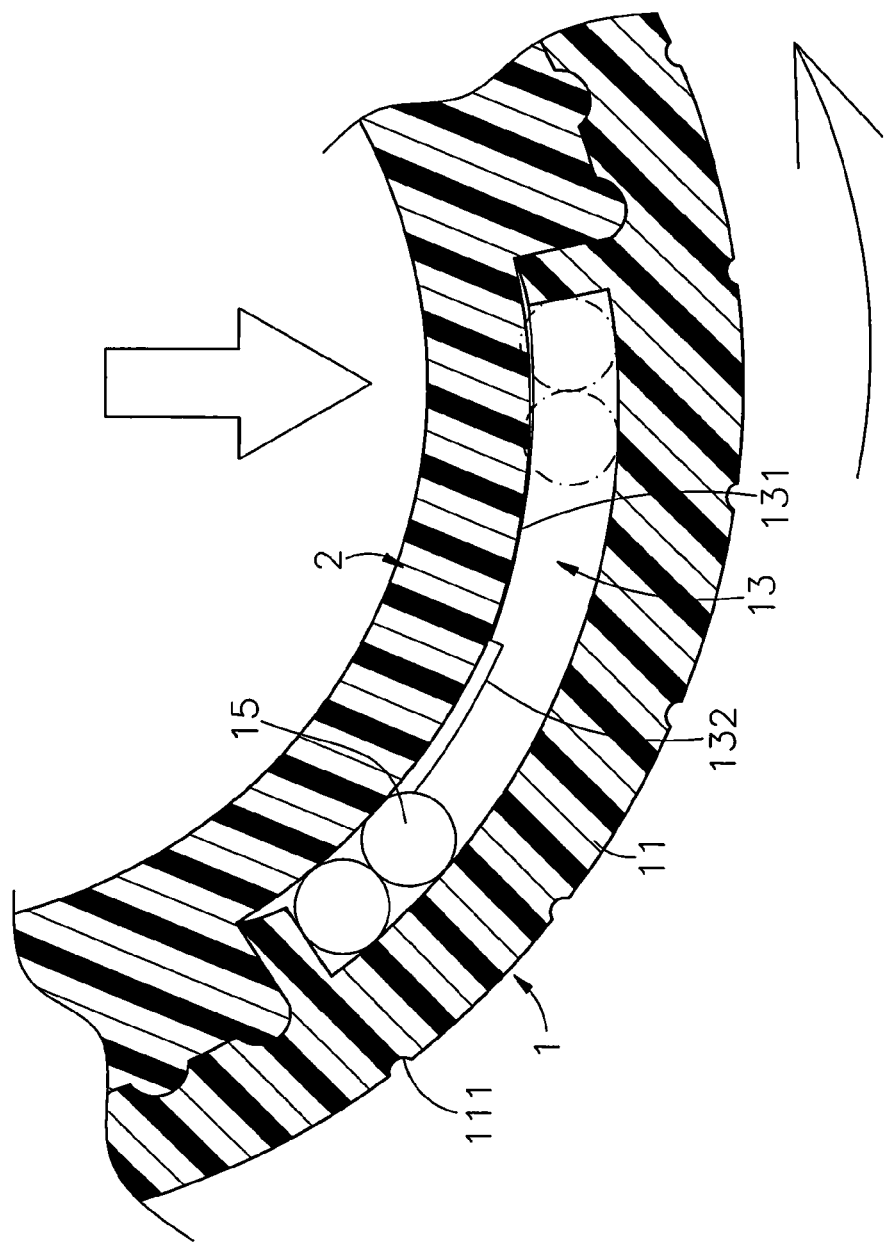
FIG. 4 schematically shows the use of the present invention (1).
Figure 5:
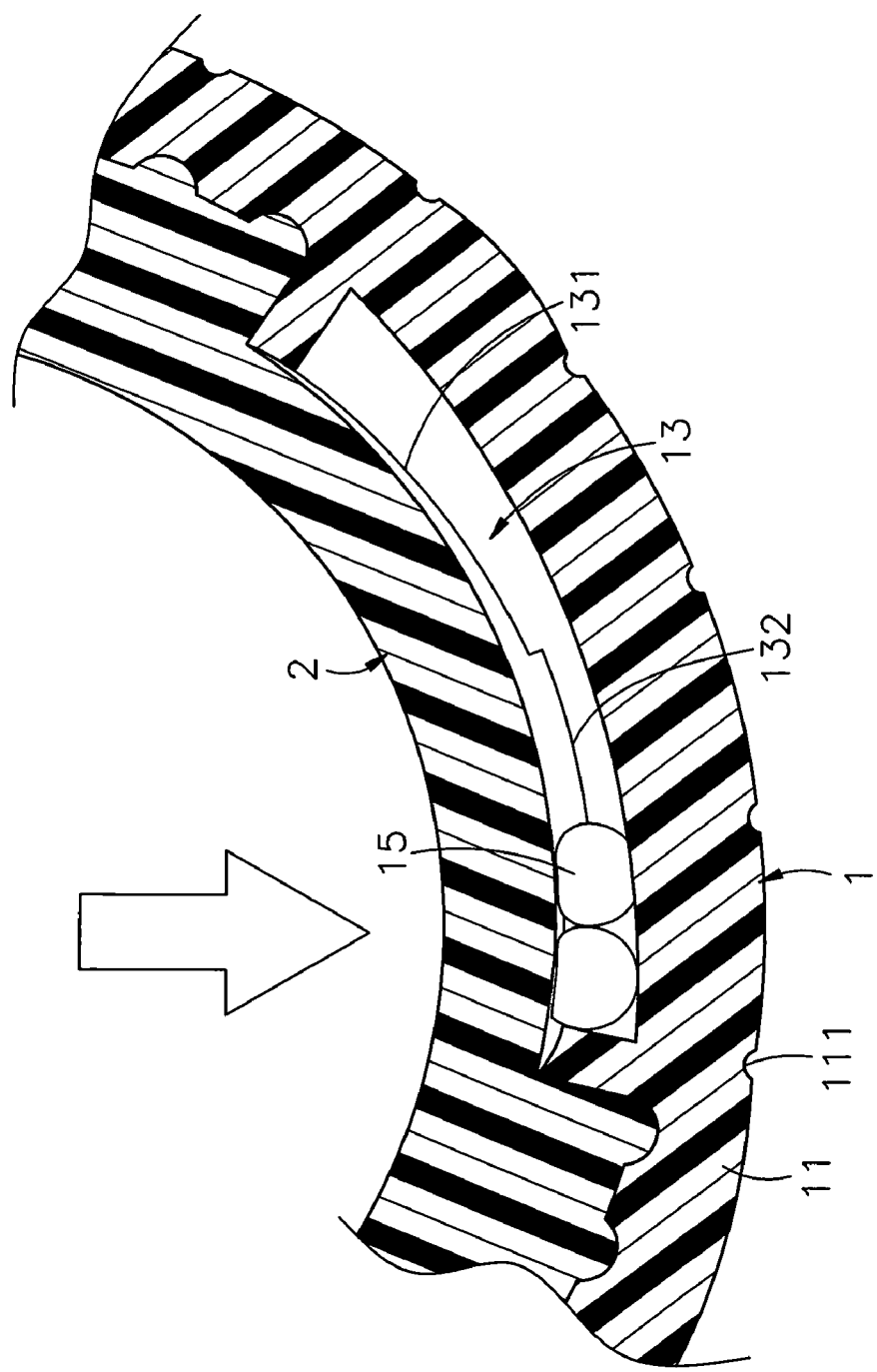
FIG. 5 schematically shows the use of the present invention (2).
Figure 6:
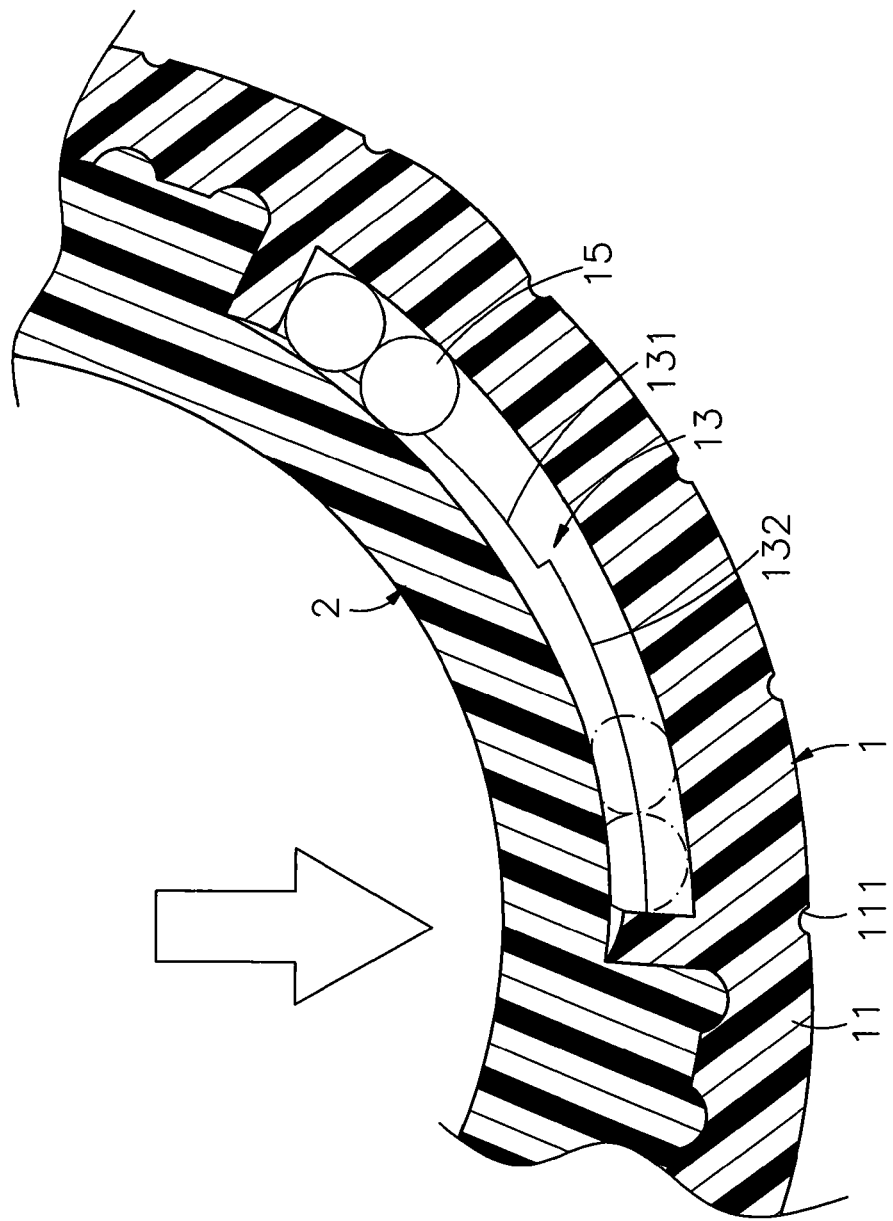
FIG. 6 schematically shows the use of the present invention (3).

Refer to FIGS. 1~3, which are a three-dimensional decomposition drawing according to one preferred embodiment of the present invention, a sectional axonometric drawing of a subtyre and a section of the present invention from a side view according to one preferred embodiment respectively. As shown clearly in these figures, the composite ball-bouncing tyre disclosed in the present invention comprises a subtyre 1 and an inner tube 2 inside it, wherein:

The subtyre 1 contains a ring-shaped base 11 and a sidewall 12 that extends inwards on both sides of the base 11, and a space 10 is formed between the ring-shaped base 11 and sidewall 12. A tread design 111 can be established on the external walls of the base 11, and a plurality of rails 13 and fastening grooves 14 are arranged at regular intervals on the inner walls of the space 10. There is a slope part 131 that converges in the direction opposite to rolling forward of the subtyre 1 on the top of the plurality of rails 13, and a converging groove 132 is set up at one side of the slope part 131 against the forward rolling direction. A plurality of fixing grooves 141 is established vertically to the rolling direction at the bottom of the fastening grooves 14, and there are one or more resilient balls 15 that can reciprocate inside each rail 13.

The inner tube 2 is installed into the space 10 in the subtyre 1, and includes a base component 21 that rotates with a wheel rim 3 inside it and enables the resilient balls 15 to bounce within the rail 13 as the slope part 131 presses. On external walls of the base component 21, a plurality of fixing parts 22 is set up to be placed into the fastening grooves 14 of the subtyre 1 for fixing purpose, and a plurality of fastening parts 221 projects from the top of the fixing parts 22 to be fastened into the plurality of the fixing grooves 141 of each fastening groove 14.

For fabrication of the components as mentioned in the preceding paragraph, put the uninflated inner tube 2 inside the space 10 of the subtyre 1, and then inflate the inner tube 2, till the fixing parts 22 are inserted and fastened into the fastening grooves 14 of the subtyre 1 respectively, and the fastening parts 221 of each fixing part 22 are inserted and fastened tightly into the fixing grooves 141 of each fastening groove 14 for fixing purpose. After the subtyre 1, together with the inner tube 2, is installed around the wheel rim 3, fabrication of the present invention will be completed.

The fastening groove 14 of the subtyre 1 and the fixing part 22 of the inner tube 2 may be in the form of a trapezoid, dovetail or any other shape with narrow openings and wide interior, as long as they can prevent the inner tube 2 from being separated from the subtyre 1 after the inner tube 2 is inflated to make the fixing parts 22 inserted into the fastening grooves 14. This shall not be construed as limiting the scope of the appended claims of the present invention. It is hereby declared that all modifications and equivalent structural changes made on the basis of the descriptions and drawings given in the present invention shall be included in the patent claims of the present invention.

Turn to FIGS. 1, 2, 4, 5 and 6, which are a three-dimensional decomposition drawing according to one preferred embodiment of the present invention, a sectional axonometric drawing of the subtyre, a schematic drawing of use of the present invention (1), a schematic drawing of use of the present invention (2) and a schematic drawing of use of the present invention (3) respectively. As shown clearly in these figures, the subtyre 1 and the inner tube 2 are installed around the wheel rim 3, which will be driven to roll on the road by a vehicle. When the wheels move forward, the plurality of the fastening parts 221 of the fixing parts 22 of the inner tube 2 will be fastened tightly into the fixing grooves 141 of the fastening grooves 14. As the fastening parts 221 and fixing grooves 141 are vertical to the rolling direction of the tyre, it will avoid displacement or deformation of the fastening parts 221 along the rolling direction of the tyre, thus preventing the fastening parts 221 from being deformed by force and separated from the fixing grooves 141; when the base 11 away from the converging groove 132 under the slope part 131 is in contact with the road surface, the weight of the vehicle or the wheel rim 3 will impose a burden on the inner tube 2 and subtyre 1, which will generate deformations as they press against the front side of the slope part 131 of the converging groove 132. Since the slope part 131 inclines towards the other side and shrinks, the inner tube 2 will press upon one or more resilient balls 15 inside the rail 13 along the rolling direction of the wheel rim 3, thus pushing these resilient balls towards one end of the converging groove 132.

When the wheel rim 3 rolls till the base 11 under the final end of the converging groove 132 contacts the road surface, the weight of the vehicle or the wheel rim 3 will be placed on the inner tube 2 and subtyre 1 at one end of the converging groove 132. Because there is great difference of force between one end of the converging groove 132 and the slope part 131 at the other end, the inner tube 2 and subtyre 1 will deform considerably due to impact of force. The resilient balls 15 will also tend to move towards the end of the converging groove 132 due to impact of force, and deform visibly due to squeezing of the inner tube 2 and subtyre 1. When the wheel rim 3 continues to roll till the application point of its weight goes away from the rail 13, the deformed points of the inner tube 2 and subtyre 1 will move away from the rail 13, and the resilient balls 15 will be pressed to move towards the front end of the slope part 131. As they move, these balls will push against the walls of the rail 13 in front of the slope part 131, and will produce a supplementary pushing force on the subtyre 1, and coincidentally, the direction of such supplementary pushing force is the same as the rolling direction of the wheel rim 3. As a result, it will reduce the force necessary for vehicles to drive the subtyre 1, the inner tube 2 and the wheel rim 3 to roll, thus reducing the oil consumption of these vehicles and producing the benefits in energy-conservation and environmental protection.

The tread design 111 on the external surface of the base 11 of the subtyre 1 may be worn down in the long run, while the inner tube 2 may be pierced by sharp articles or affected by other situations. If it is necessary to replace the subtyre 1 or the inner tube 2 under such circumstances, the inner tube 2 can be deflated first to disengage its fixing parts 22 from the fastening grooves 14 of the subtyre 1, and then the subtyre 1 or inner tube 2 can be separated from the wheel rim 3 and be replaced. Since the subtyre 1 and inner tube 2 can be replaced independently and it is unnecessary to replace the tyre in whole, this will save the costs for maintenance and replacement.

In addition, lubricating oils can be applied inside the rails 13 of the subtyre 1 to reduce the friction between the resilient balls 15 and walls of the rails 13 when the resilient balls 15 move internally. This can reduce the losses of the pushing force generated by the resilient balls 15, so that these balls can produce greater supplementary pushing force on the subtyre 1.

When applied practically, the composite ball-bouncing tyre disclosed in the present invention has the advantages as follows:

(1) The subtyre 1 includes the fastening grooves 14, and the inner tube 2 contains the fixing parts 22. This ensures that when the inner tube 2 is installed in the space 10 within the subtyre 1 and inflated, the fixing parts 22 of the inner tube 2 can be tightly fastened into the fastening grooves 14 of the subtyre 1, thus making the inner tube 2 and subtyre 1 be fixed firmly. And after the inner tube 2 is deflated, it will be disengaged from the subtyre 1, thus the subtyre 1 or inner tube 2 can be replaced independently to complete tyre replacement.

(2) There are one or more resilient balls 15 installed inside the rails 13 of the subtyre 1. So when the wheel rim 3 drives the subtyre 1 and inner tube 2 to rotate, the subtyre 1 or inner tube 2 will deform and press the resilient balls 15. By using the slope part 131 and the converging groove 132, the resilient balls 15 can move back and forth within the rail 13, and push against the side walls of the rail 13 close to the front end of the slope part 131, thus producing a supplementary force that can drive the tyre to roll.

(3) The subtyre 1 includes the concave rails 13, fastening grooves 14 and fixing grooves 141, while the inner tube 2 includes the convex fixing parts 22 and fastening parts 221, and these concave and convex parts help to increase the contact area between the subtyre 1 and the inner tube 2. On one hand, it can improve the safety of the tyre, and on the other hand, it helps reduce the weight of the subtyre 1, thus achieving the energy-saving effect.

Therefore, while the present invention mainly deals with the composite ball-bouncing tyre, it allows a plurality of rails 13 and fastening grooves 14 to be arranged at intervals on inner walls of the base 11 of the subtyre 1, and includes a plurality of fixing parts 22 on the inner tube 2 within the subtyre 1. So the fixing parts 22 of the inner tube 2 can be inserted into the fastening grooves 14 of the subtyre 1 for fixing purpose after the inner tube 2 is inflated, and the mastery tyre 2 can be separated from the subtyre 1 after it is deflated. In this way, it enables the subtyre 1 or inner tube 2 to be removed and replaced independently, thus improving safety by increasing the area of contact between the subtyre and the inner tube. Besides, it allows the subtyre to weigh less, thus achieving better energy-saving effect. However, the above descriptions are given to illustrate only one example of the preferred embodiment of the present invention, and shall not be construed as limiting the scope of the appended claims of the present invention. It is hereby declared that all modifications and equivalent structural changes made on the basis of the descriptions and drawings disclosed in the present invention shall be included in the patent claims of the present invention.

In summary, when applied, the composite ball-bouncing tyre of the present invention as described above can really achieve its functions and objectives. Therefore, the present invention is actually an excellent one with practical applicability, and satisfies the conditions for patentability of a utility model. While the application of patent is filed pursuant to applicable laws, your early approval of the present invention will be highly appreciated so as to guarantee benefits and rights of the inventor who has worked hard at this invention. For any question, please do not hesitate to inform the inventor by mail, and the inventor will try his best to cooperate with you.

The invention claimed is:

1. A composite ball-bouncing tyre, particularly the tyre that is installed on wheel rims to roll, comprising a subtyre and an inner tube inside, wherein:

a space is formed between a ring-shaped base of the subtyre and two side walls of the base that extend inwardly, and a plurality of rails and fastening grooves are established at intervals on inner walls of the space; at top of both sides of these rails, there is a slope part that converges along the rolling direction of the subtyre, and at the bottom of the fastening grooves, there is a plurality of fixing grooves that are vertical to the rolling direction; and one or more resilient balls that reciprocate are installed inside each rail;

the inner tube is installed within the space, and includes a base component that rotates together with a wheel rim inside it and enables the resilient balls to bounce within the rail as the slope part presses; on outer walls of the base component, there is a plurality of fixing parts that can be inserted into the fastening grooves of the subtyre for fixing purpose, and a plurality of fastening parts projects from the surface of each fixing part and is used to be placed into a plurality of fixing grooves inside the fastening grooves.

2. The composite ball-bouncing tyre according to claim 1, wherein the base of the subtyre includes a converging groove on one side of the slope part in the direction opposite to the moving forward, which is used for the inner tube to squeeze and deform the resilient balls considerably.

3. The composite ball-bouncing tyre according to claim 1, wherein the fastening grooves of the subtyre and fixing parts of the inner tube may be in the form of a trapezoid or dovetail.

* * * * *